United States Patent
Yamamoto (10) Patent No.: US 7,561,064 B2
(45) Date of Patent: Jul. 14, 2009

(54) VEHICLE LIGHT CONTROL APPARATUS, SYSTEM AND METHOD

(75) Inventor: Atsushi Yamamoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 11/783,766

(22) Filed: Apr. 12, 2007

(65) Prior Publication Data
US 2007/0262882 A1 Nov. 15, 2007

(30) Foreign Application Priority Data
May 9, 2006 (JP) .............................. 2006-130809

(51) Int. Cl.
B60Q 1/00 (2006.01)
B60Q 1/26 (2006.01)
G08B 1/08 (2006.01)
G08G 1/00 (2006.01)
G08G 1/01 (2006.01)
G08G 1/04 (2006.01)
G01B 5/00 (2006.01)
G05D 1/00 (2006.01)
G06F 7/00 (2006.01)

(52) U.S. Cl. .................... 340/902; 340/425.5; 340/468; 340/469; 340/539.1; 340/901; 340/933; 340/937; 340/942; 362/460; 362/464; 362/465; 362/466; 362/467; 362/468; 362/469; 701/1; 701/36

(58) Field of Classification Search .............. 340/425.5, 340/539.1, 902, 933, 937, 942, 468, 469; 362/460, 464, 465, 466, 467, 468; 701/1, 701/36
See application file for complete search history.

(56) References Cited

U.S. PATENT DOCUMENTS

| 4,891,559 | A | * | 1/1990 | Matsumoto et al. ........... 315/82 |
| 5,499,168 | A | * | 3/1996 | Cochard et al. ............. 362/466 |
| 6,396,397 | B1 | * | 5/2002 | Bos et al. ..................... 340/461 |
| 6,538,622 | B1 | * | 3/2003 | Kojima et al. ................... 345/7 |
| 6,861,809 | B2 | | 3/2005 | Stam |
| 7,157,856 | B2 | * | 1/2007 | Chon et al. .................... 315/82 |
| 2003/0167123 | A1 | | 9/2003 | Nakazawa et al. |
| 2004/0114381 | A1 | * | 6/2004 | Salmeen et al. ............. 362/465 |

FOREIGN PATENT DOCUMENTS

| JP | A-2000-62522 | 2/2000 |
| JP | A-2001-26236 | 1/2001 |

* cited by examiner

Primary Examiner—Benjamin C Lee
Assistant Examiner—Lam P Pham
(74) Attorney, Agent, or Firm—Posz Law Group, PLC (57) ABSTRACT

A vehicle light control apparatus includes an illumination control unit for executing illumination control on the mode of illumination of a subject vehicle based on signal transmission of a vehicle ID signal unique to the subject vehicle and signal reception of the vehicle ID signal unique to the subject vehicle. The control unit identifies a vehicle having brightness exceeding a predetermined threshold from an image of other vehicles acquired through an image recognition MPU as a vehicle having an illumination adjustment failure, and returns the same vehicle identification signal transmitted from the other vehicle thus identified to vehicles other than the subject vehicle.

15 Claims, 5 Drawing Sheets

VEHICLE LIGHT CONTROL APPARATUS, SYSTEM AND METHOD

CROSS REFERENCE TO RELATED APPLICATION

This application is based on and incorporates herein by reference Japanese Patent Application No. 2006-130809 filed on May 9, 2006.

FIELD OF THE INVENTION

The present invention relates to a vehicle light control apparatus for controlling a vehicle-mounted light such as a headlight and a tail light, a vehicle light control system using such a control apparatus, and a vehicle light control method among a plurality of vehicles.

BACKGROUND OF THE INVENTION

When a vehicle driver receives glaring light radiated from the headlights of an oncoming vehicle at night, it is a general practice to notify the driver of the oncoming vehicle of the fact by blinking the headlights to prompt him or her to reduce the intensity of the headlights through a change in the illumination mode, for example, from high beam to low beam. However, it depends on the mind of the driver of the oncoming vehicle whether the intensity of the headlights is reduced or not. Therefore, if the driver of the oncoming vehicle is bad-mannered, the headlight intensity will not be properly reduced even if the driver is so prompted. Thus, the driver may be dazzled by the light radiated from the headlights of the oncoming vehicle, and the field of view of the vehicle may consequently be obscured.

JP 2001-26236A (Document 1), for example, proposes a vehicle control apparatus. When a vehicle and another vehicle behind the same are equipped with this control apparatus, the quantity of light from the headlights of the trailing vehicle is detected by the subject vehicle (the leading vehicle preceding the trailing vehicle in this case), and the distance between the vehicles is detected at the trailing vehicle. When the quantity of light from the headlights of the trailing vehicle exceeds a predetermined quantity, the control apparatus of the leading vehicle transmits a control signal indicating the fact to the control apparatus of the trailing vehicle. When the vehicle distance falls below a predetermined value and the control signal is also received, the control apparatus of the trailing vehicle exercises control for reducing the intensity of the headlights or changing the angle of radiation. Therefore, a desirable field of view can be maintained at a subject (controlled) vehicle without any special operation where vehicles carry such control apparatus.

U.S. Pat. No. 6,861,809 proposes another vehicle light control apparatus. This vehicle light control apparatus exercises light distribution control for automatically switching the vehicle carrying the apparatus from high beam to low beam when it detects the tail lights of a leading vehicle or the headlights of the oncoming vehicle.

A subject vehicle will have many leading vehicles and oncoming vehicles on a road having heavy traffic, and the above vehicle light control apparatuses may not be able to maintain a sufficient field of view at the subject vehicle in such cases as exemplified below.

First, the vehicle light control apparatus disclosed in Document 1 indiscriminately transmits the control signal to the control apparatus of all vehicles concerned even when, for example, the quantity of light from only one of the plurality of vehicles is excessive. It is not possible to request only the vehicle having the excessive quantity of light to reduce the intensity of light. The vehicle light control apparatus disclosed in Document 2 only controls the light distribution of the subject vehicle (reduces the intensity of the lights) by detecting a leading vehicle or oncoming vehicle. In this case, the problem of an insufficient field of view at the subject vehicle cannot be solved, unless an illumination adjusting process such as reducing light intensity is carried out at the other vehicle. As thus described, either of the vehicle light control apparatus has not been able to sufficiently mitigate the problem of an insufficient field of view at a subject vehicle caused by an illumination adjustment failure such as an excessive quantity of light or a light distribution failure at another vehicle running near the same.

SUMMARY OF THE INVENTION

It is therefore an object of the present invention to provide a vehicle light control system and a vehicle light control apparatus, which maintain a desirable field of view at a subject vehicle even on a road having heavy traffic.

According to one aspect, a vehicle light control apparatus and method comprises an illumination control unit and an illumination adjustment unit. The illumination control unit executes illumination control on a mode of illumination of a headlight of a subject vehicle based on signal transmission of a subject identification signal unique to the subject vehicle and signal reception of the subject identification signal. The illumination adjustment requesting unit identifies another vehicle having an illumination adjustment failure and returning another identification signal transmitted from the another vehicle and unique to the another vehicle, so that the another vehicle adjusts a mode of illumination thereof in response to the returned another identification signal.

According to another aspect, in a vehicle light control method, a subject vehicle takes an image of other vehicles around the subject vehicle and receives identification signals unique to the other vehicles, respectively. The subject vehicle detects, in the other vehicles, another vehicle that has brightness exceeding a predetermined threshold in the image. The subject vehicle transmits a return signal identifying this vehicle. This vehicle reduces intensity of illumination of its headlight in response to the return signal transmitted from the subject vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
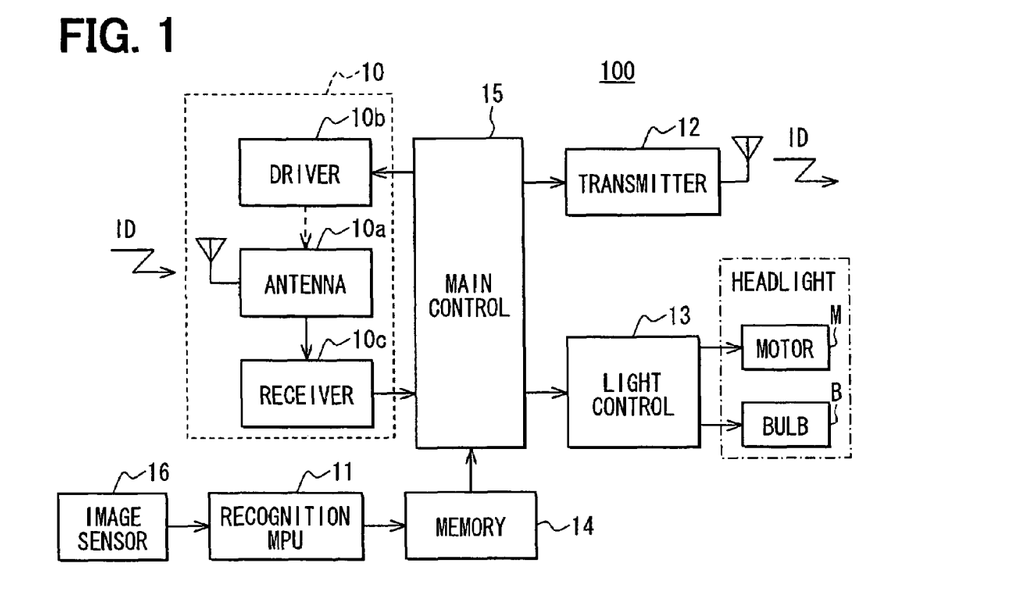
FIG. 1 is a block diagram showing a vehicle light control apparatus according to an embodiment of the present invention.

Referring first to FIG. 1, a vehicle light control apparatus in a subject vehicle 100 includes a signal receiver unit 10, an image recognition MPU (microprocessor unit) 11, a signal transmitter unit 12, a headlight control unit 13, and a memory 14 each of which is connected to a main control unit 15. In the present embodiment, a vehicle light control system is formed by a plurality of vehicles having such vehicle light control apparatuses, respectively.

The signal receiver unit 10 includes a directional antenna 10a, an antenna driver unit 10b including a pulse motor coupled with the directional antenna 10a, and a signal receiver circuit 10c electrically connected to the directional antenna 10a. The directional antenna 10a is disposed on a vehicle such that the direction pointed by the same can be varied with respect to the traveling direction of the vehicle. When a pulse signal is input from the main control unit 15, the pulse motor in the antenna driver unit 10b is driven by the number of pulses represented by the pulse signal to change the direction pointed by the directional antenna 10a.

An image sensor 16 is connected to the image recognition MPU 11. The image sensor 16 is configured as an imaging unit having a CCD (charge-coupled device) and provided in the middle of the front of the vehicle such that it can form an image of objects existing in front of the vehicle. The image recognition MPU 11 transmits image data acquired through the image sensor 16 to the main control unit 15.

Each of a motor M drivingly coupled with an optical axis adjusting mechanism and a bulb B of a headlight is connected to the headlight control unit 13. This headlight is provided for both front left side and front right side of the vehicle. When a control signal for changing the illumination mode of the headlight is input to the headlight control unit 13 from the main control unit 15, the unit reduces the intensity of light from the headlight by controlling a voltage or current supplied to the bulb B. When the headlight is in a high-beam state when the control signal is input, the headlight control unit 13 switches the headlight to low beam by driving the motor M.

Further, a vehicle ID (identification) code unique to the vehicle (e.g., production serial number of the vehicle), a brightness threshold BTH, and a distance threshold DTH are stored in advance in the memory 14. The value set as the brightness threshold BTH is the brightness of an image of another vehicle acquired through the image sensor 16 and the image recognition MPU 11 when the headlight of the other vehicle feel glaring for the driver of the subject vehicle or the other vehicle has an illumination adjustment failure such as an excessive quantity of light or a light distribution failure. The value set as the distance threshold DTH is the distance of the other vehicle from the subject vehicle at which the field of view from the subject vehicle can be obscured.

Figure 2:
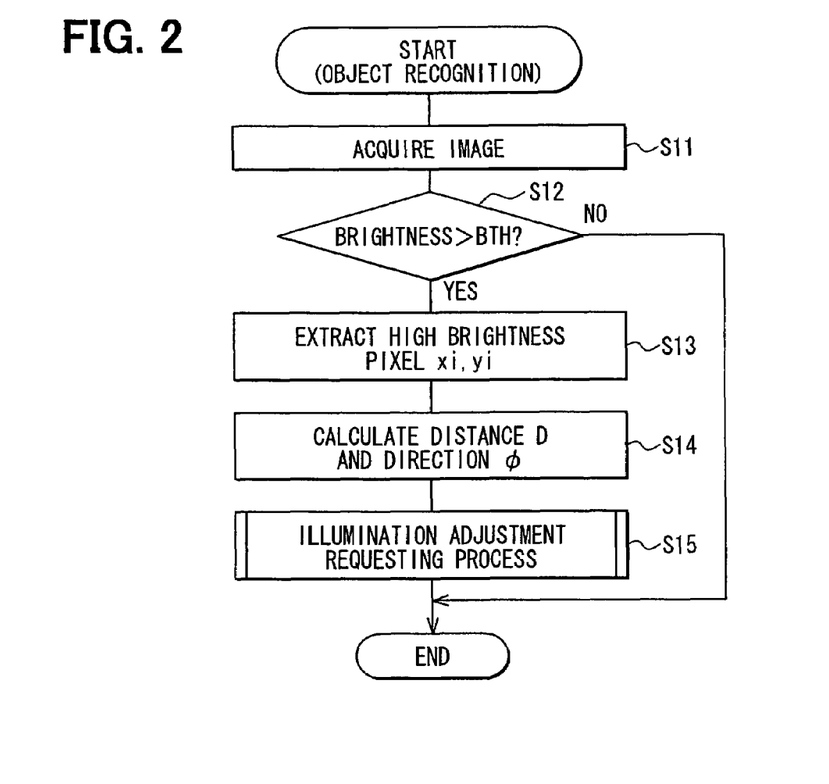
FIG. 2 is a flow chart showing a high-brightness object recognition process executed by a control unit of the vehicle light control apparatus.
Figure 3:
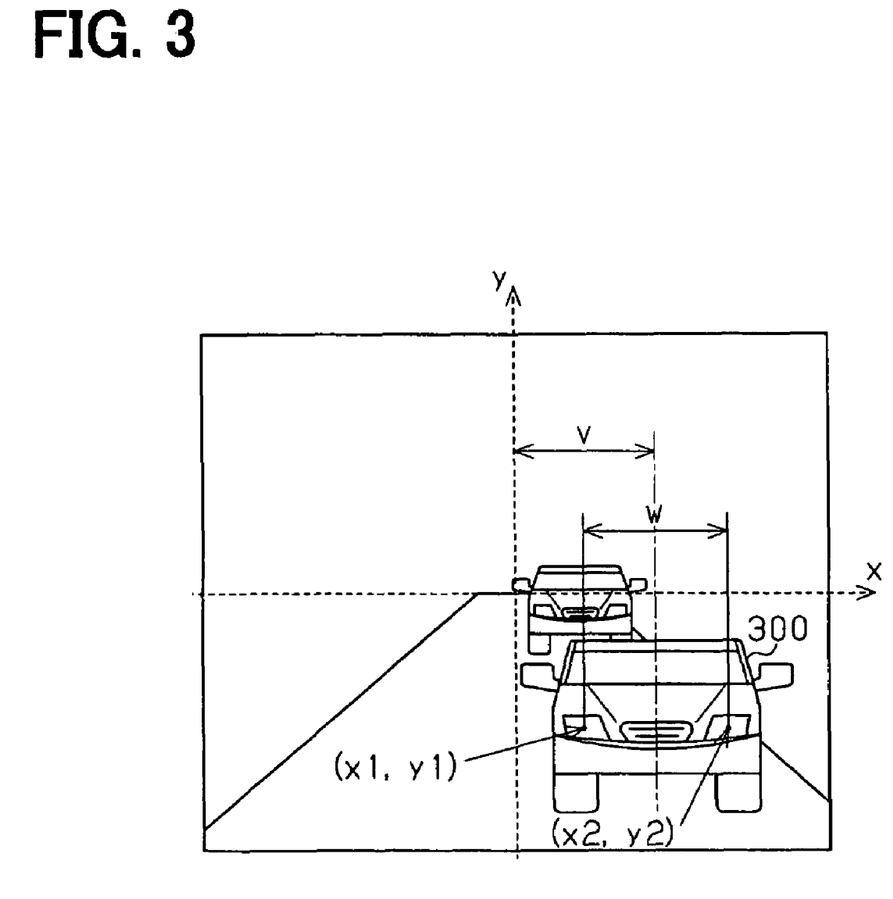
FIG. 3 is a schematic view showing an example of an image acquired through an image sensor and an image recognition MPU of the vehicle light control apparatus.

The main control unit 15 transmits a vehicle ID signal including a vehicle ID code stored in the memory 14, and performs a high-brightness object recognition process shown in FIG. 2 and an illumination adjusting process shown in FIG. 3 at predetermined respective time intervals.

As shown in FIG. 2, the main control unit 15 acquires an image of other vehicles through the image sensor 16 and the image recognition MPU 11 at step S11. At a subsequent step S12, the main control unit 15 determines whether a brightness value indicating the brightness of the image of other vehicles thus acquired is greater than the brightness threshold BTH or not. If it is determined at step S12 that the brightness value of the image of other vehicles is greater than the brightness threshold BTH, the main control unit 15 extracts the coordinates (xi, yi) of pixels having the high brightness in the image of other vehicles at a subsequent step S13. Specifically, the main control unit 15 identifies a vehicle having an illumination adjustment failure at step S13. At step S14, the main control unit 15 calculates the distance of the other vehicle having an illumination adjustment failure from the subject vehicle (vehicle distance D) and the direction of the other vehicle from the subject vehicle (direction $\phi$). At a subsequent step S15, an illumination adjustment requesting process is executed based on the calculated vehicle distance D and direction $\phi$. When it is determined at step S12 that the brightness value of the image of other vehicles is equal to or smaller than the brightness threshold BTH, the main control unit 15 temporarily terminates this process.

The vehicle distance D and the direction $\phi$ may be calculated in the following manner. FIG. 3 schematically shows an example of an image of other vehicles acquired through the image sensor 16 and the image recognition MPU 11. It is assumed that the headlights of an oncoming vehicle 300 that is in the foreground of the acquired image shown in FIG. 3 have an excessive quantity of light or a brightness value greater than the brightness threshold BTH.

In this case, the coordinates of the neighborhood of the headlights of the oncoming vehicle 300 are the coordinates (xi, yi) of a group of pixels having high brightness. To calculate the vehicle distance D and the direction $\phi$, coordinates (x1, y1) and (x2, y2) of the centers of the headlights are obtained from the coordinates (xi, yi) of the pixel group. The distance between the headlights (distance W) and a distance V from an axis (Y-axis) at which the acquired image is divided into two parts, i.e., left and right parts are further identified from the coordinates (x1, y1) and (x2, y2) of the center. The vehicle distance D and the direction $\phi$ are calculated based on the distances W and V. Specifically, since the vehicle distance D is inversely proportional to the distance W, it is calculated using the following relational expression.

Vehicle Distance $D = \alpha/W$

The tangent (tan $\phi$) of the direction $\phi$ is calculated using the following relational expression because it is proportional to the distance V.

$\tan \phi = \beta \times V$

The characters $\alpha$ and $\beta$ represent proportional constants, which are values determined by the magnification of the image of other vehicles acquired through the image sensor 16 and the image recognition MPU 11. The proportional constants $\alpha$ and $\beta$ are obtained in advance based on a comparison between the distances W and V in the image of the other vehicle acquired through the image sensor 16 and the image recognition MPU 11, the actual distance of the other vehicle from the subject vehicle, and the actual direction of the other vehicle from the subject vehicle.

Figure 4:
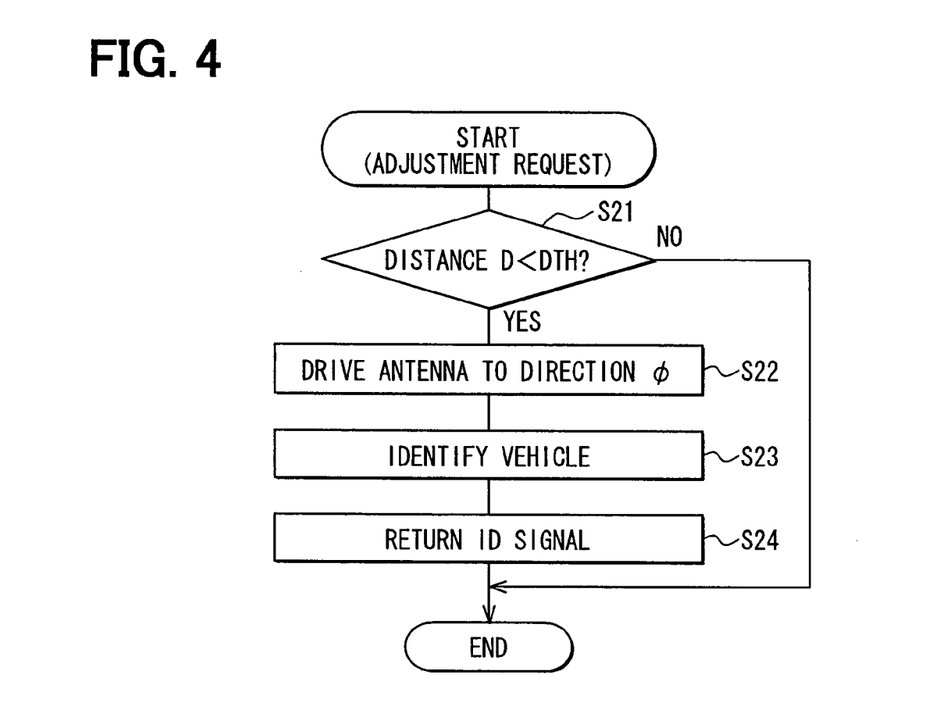
FIG. 4 is a flow chart showing an illumination adjustment requesting process executed by the control unit of the vehicle light control apparatus.

The process of requesting illumination adjustment executed at step S15 is described below with reference to FIG. 4.

The main control unit 15 first determines whether the vehicle distance D to the oncoming vehicle is smaller than the distance threshold DTH or not at step S21. When it is determined at step S21 that the vehicle distance D is smaller than the distance threshold DTH or when the vehicle distance D has decreased below a distance within which the field of view at the subject vehicle can be obscured, the main control unit 15 operates the directional antenna 10a at step S22 such that it will point in the direction φ calculated at step S14 (FIG. 2). Specifically, the main control unit 15 calculates the number of pulses to be supplied to the pulse motor to cause the directional antenna 10a to point in the direction φ, generates a pulse signal according to the number of pulses, and outputs the pulse signal to the antenna driver unit 10b. Thus, the direction pointed by the directional antenna 10a is changed through the driving of the pulse motor in the antenna driver unit 10b, and the antenna will point in the direction φ obtained at step S14.

Thereafter, the main control unit 15 identifies another vehicle having an improper illumination adjustment from a vehicle ID signal received through the directional antenna 10a at a subsequent step S23. At step S24, the main control unit 15 returns the vehicle ID code received at step S23. Specifically, the main control unit 15 returns the vehicle ID signal from the other vehicle identified as described above at the timing when the vehicle distance D decreases below the distance threshold DTH through the illumination adjustment request. When it is determined at step S21 that the vehicle distance D is equal to or greater than the distance threshold DTH, the main control unit 15 temporarily terminates the process.

Figure 5:
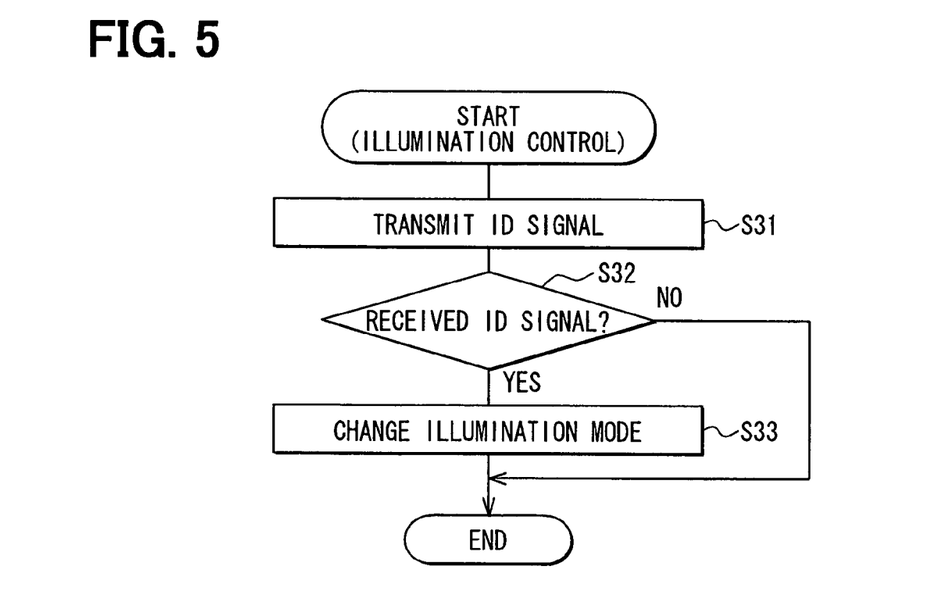
FIG. 5 is a flow chart showing an illumination controlling process executed by the control unit of the vehicle light control apparatus.

The illumination control is executed by the main control unit 15 as shown in FIG. 5.

The main control unit 15 first transmits the vehicle ID signal of the vehicle carrying the same unit at step S31. At a subsequent step S32, it is determined whether the vehicle ID signal of the subject vehicle has been received or not. When it is determined at step S32 that the vehicle ID signal of the subject vehicle has been received, the main control unit 15 outputs a control signal requesting a change in the mode of illumination of the headlight to the headlight control unit 13 in step S33. Thus, the intensity of the headlight is reduced, and the headlight is changed to low beam when high beam have been emitted. When it is determined at step S32 that the vehicle ID signal of the subject vehicle has not been received, the main control unit 15 temporarily terminates the process. Thus, the main control unit 15 executes the illumination control which allows the mode of illumination of the subject vehicle to be controlled based on the signal transmission and signal reception of the vehicle ID signal unique to the vehicle.

Figure 6:
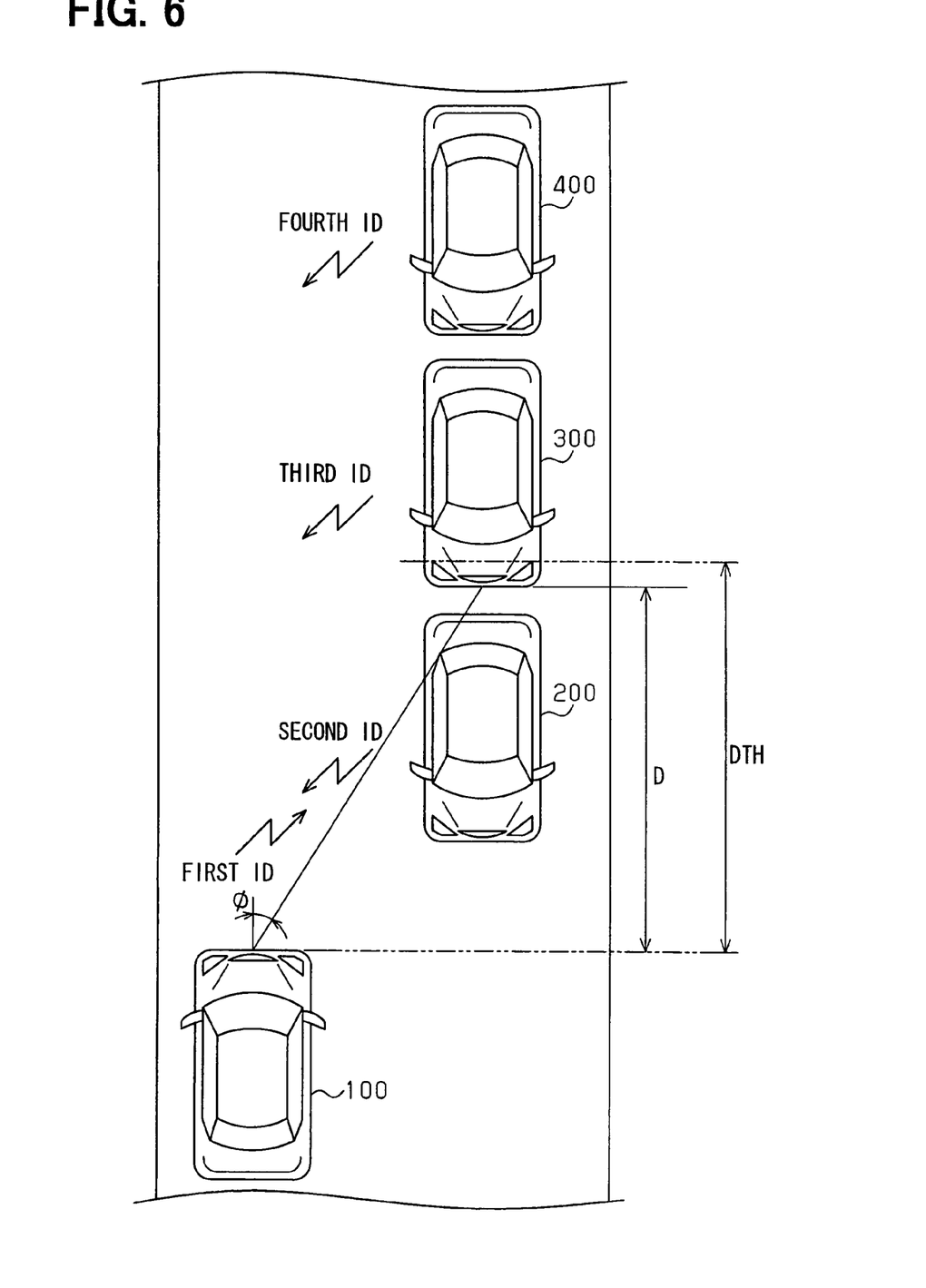
FIG. 6 is a plan view schematically showing a situation in which a subject vehicle and other vehicles having vehicle light control apparatus.
Figure 7:
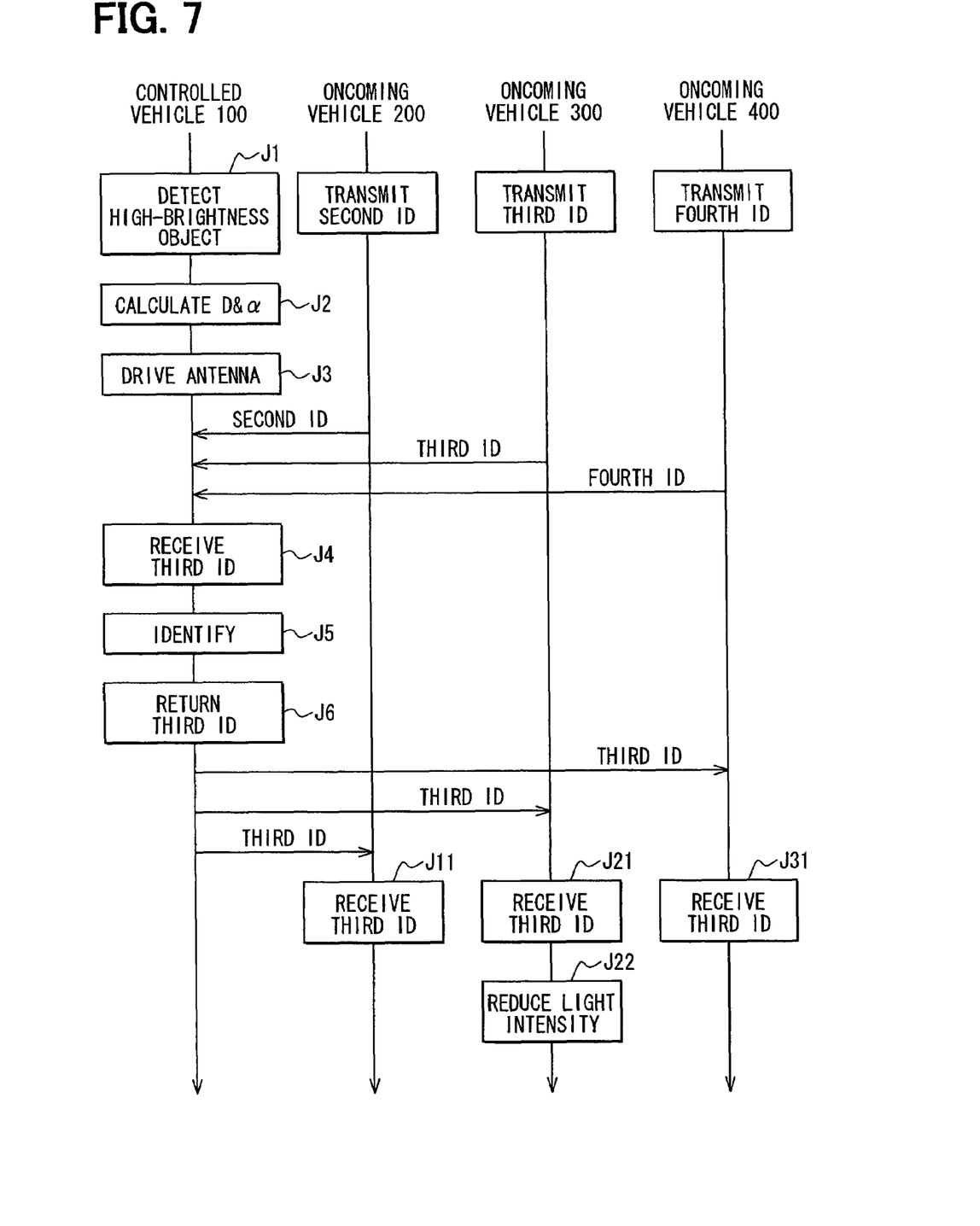
FIG. 7 is a sequence chart showing processes executed between a subject vehicle and another vehicle having vehicle light control apparatuses according to the embodiment.

Mutual control of vehicle illumination modes is carried out between vehicles equipped with a vehicle light control apparatus having such a configuration based on signal transmission and signal reception of vehicle ID signals as described above, and a desirable field of view can be maintained at the subject vehicles. As shown in FIG. 6, the mutual control of illumination modes executed between vehicles will be described by referring to an example in which three oncoming vehicles 200, 300 and 400 equipped with the same vehicle light control apparatuses and a subject vehicle 100 also equipped with the same vehicle light control apparatus pass each other on a road. It is assumed that the headlight of the oncoming vehicle 300 has an excessive quantity of light and that the vehicle distance D of the oncoming vehicle 300 from the subject vehicle 100 is shorter than the distance threshold DTH. A first vehicle ID signal is transmitted from the subject vehicle 100 at predetermined time intervals, and second, third and fourth vehicle ID signals are transmitted from the oncoming vehicles 200, 300, and 400, respectively, at predetermined time intervals. FIG. 7 shows processes executed between the subject vehicle 100 and the oncoming vehicles 200, 300, and 400.

As shown in FIG. 7, the subject vehicle 100 first executes the detection of high-brightness objects at step J1 (steps S11 and S12 in FIG. 2) and acquires the coordinates of the neighborhood of the headlights of the oncoming vehicle 300 as the coordinates of a group of high-brightness pixels (step S13 in FIG. 2). At a subsequent step J2, the subject vehicle 100 calculates the vehicle distance D of the oncoming vehicle 300 from the subject vehicle 100 and the direction φ of the oncoming vehicle 300 from the subject vehicle 100 (step S14 in FIG. 2). When the calculated vehicle distance D is smaller than the distance threshold DTH, the directional antenna 10a of the subject vehicle 100 is operated such that it will point in the direction φ at a subsequent step J3 (steps S21 and S22 in FIG. 4).

With the directional antenna 10a pointing in the direction φ, the subject vehicle 100 receives the third vehicle ID signal transmitted from the oncoming vehicle 300 located in the direction φ pointed by the directional antenna 10a at step J4. Thus, the oncoming vehicle 300 is identified by the subject vehicle 100 as a vehicle having an illumination adjustment failure or an improper illumination at a subsequent step J5 (step S23 in FIG. 4). At step J6, the subject vehicle 100 returns the third vehicle ID signal received at step J4 (step S24 in FIG. 4).

The oncoming vehicles 200, 300 and 400 receive the third vehicle ID signal returned from the subject vehicle 100 at steps J11, J21 and J31, respectively. At the oncoming vehicle 300, which has received the vehicle ID signal of itself, the intensity of the headlight is reduced at step J12 (which corresponds to steps S32 and S33 in FIG. 4). Thus, the driver of the subject vehicle 100 can maintain a desirable field of view at his or her vehicle.

In the present embodiment, the main control unit 15 operates as an illumination adjustment requesting unit, an illumination control unit, a direction detecting unit, and a distance detecting unit. In addition, the image sensor 16 operates as an imaging device, and the image recognition MPU 11 operates as an image processing unit. Still further, the antenna driver unit 10b, the signal receiver circuit 10c and the signal transmitter unit 12 collectively operate as a communication unit.

As described above, the vehicle light control apparatus of the present embodiment can provide the following advantages.

(1) When a brightness value indicating the brightness of an image of other vehicles acquired through the image sensor 16 and the image recognition MPU 11 is greater than the brightness threshold BTH, a vehicle having the brightness value exceeding the brightness threshold BTH is identified as a vehicle having an illumination adjustment failure. The vehicle distance D of such a vehicle having an illumination adjustment failure from the subject vehicle and the direction φ of the same vehicle from the subject vehicle are calculated based on the coordinates of a group of pixels having brightness value greater than the brightness threshold BTH. When the calculated vehicle distance D is shorter than the distance threshold DTH that is set as a distance within which the field of view at the subject vehicle can be obscured by the excessive brightness, the antenna driver unit 10b drives the pulse motor to change the direction pointed by the directional antenna 10a to the direction φ, and the vehicle ID signal from the vehicle having such an illumination adjustment failure is returned to the same vehicle. Thus, when another vehicle having an illumination adjustment failure such as an excessive quantity of light or a light distribution failure that feels glaring for the driver of the subject vehicle approaches the subject vehicle to exceed the limit of distance beyond which the field of view at the subject vehicle is likely to be obscured, the vehicle ID signal of the other vehicle having an illumination adjustment failure is returned from the subject vehicle. When the other vehicle receives the vehicle ID signal of itself, illumination control over the mode of illumination, e.g., reduction of the headlight intensity is carried out at the other vehicle. It is therefore possible to keep the field of view at the subject vehicle desirable even on a road having heavy traffic.

(2) The direction $\phi$ is calculated by obtaining the distance W between the headlights of the other vehicle having an illumination adjustment failure and the distance V from an axis (Y-axis) dividing the image into two parts, i.e., left and right parts from the coordinates of a group of pixels having the brightness value exceeding the brightness threshold BTH among the pixels of the image acquired through the image sensor 16 and the image recognition MPU 11. The vehicle distance D and the direction $\phi$ are calculated using these distances W, V and proportional constants $\alpha$ and $\beta$ which are determined by the magnification of the image of the other vehicle acquired through the image sensor 16 and the image recognition MPU 11. Therefore, it is not necessary to provide a separate sensor for detecting the direction $\phi$ of the other vehicle having an illumination adjustment failure, which enables the vehicle light control apparatus to be provided with a simple configuration.

(3) The main control unit 15 returns the vehicle ID signal of the other vehicle having an illumination adjustment failure at timing when the vehicle distance D decreases below the distance threshold DTH. Thus, only the vehicle ID signal from the other vehicle which can obscure the field of view at the subject vehicle is returned, and the vehicle ID signals from other vehicles which are unlikely to obscure the field of view at the subject vehicle are not returned even when there is an illumination adjustment failure. Processing loads on the main control unit 15 can therefore be reduced.

The vehicle light control system and vehicle light control apparatus are not limited to the above embodiment, but may be implemented, for example, in the following modes which represent appropriate modifications of the embodiment.

For example, a CMOS (complementary metal-oxide semiconductor) may be used as the image sensor 16 instead of a CCD. Any other imaging device may be used as the image sensor 16.

The antenna (directional antenna 10a) of the signal receiver circuit 10c is provided separately from the antenna of the signal transmitter unit 12. Alternatively, the directional antenna 10a may be shared by the signal receiver circuit 10c and the signal transmitter unit 12.

The vehicle ID signal that is returned from the subject vehicle need not be identical to the vehicle ID signal received by the subject vehicle. The signal to be returned may be different as long as it identifies a vehicle that needs to reduce intensity of headlight illumination.

The vehicle light control apparatus, system and method are advantageous also when used for a trailing vehicle having an illumination adjustment failure. In this case, the image sensor 16 may be provided on the rear of a subject vehicle such that a scene behind the subject vehicle can be imaged.

What is claimed is:

1. A vehicle light control apparatus comprising:
    an illumination control unit for executing illumination control on a mode of illumination of a headlight of a subject vehicle based on signal transmission of a subject identification signal unique to the subject vehicle and signal reception of the subject identification signal; and
    an illumination adjustment requesting unit for identifying another vehicle having an illumination adjustment failure and returning another identification signal transmitted from the another vehicle and unique to the another vehicle, so that the another vehicle adjusts a mode of illumination thereof in response to the returned another identification signal.

2. The vehicle light control apparatus according to claim 1, wherein the illumination adjustment requesting unit includes:
    an imaging device taking an image of other vehicles present near the subject vehicle; and
    an image processing unit for detecting brightness of the other vehicles and identifying the another vehicle in the other vehicles based on detected brightness exceeding a predetermined threshold.

3. The vehicle light control apparatus according to claim 2, wherein the illumination adjustment requesting unit further includes:
    a directional antenna;
    a direction detecting unit for detecting a direction of the another vehicle from the subject vehicle; and
    a communication unit for driving the directional antenna to point in a direction of the another vehicle to receive the another identification signal from the another unit and return the another identification signal to the another vehicle.

4. The vehicle light control apparatus according to claim 3, wherein the direction detecting unit calculates the direction of the another vehicle from the subject vehicle based on coordinates of a group of pixels having brightness exceeding the threshold among a group of pixels of an image taken by the imaging device a magnification of imaging performed by the imaging device.

5. The vehicle light control apparatus according to claim 4, wherein the illumination adjustment requesting unit includes:
    a distance detecting unit for detecting a distance of the another vehicle from the subject vehicle and returning the another identification signal when a detected distance decreases to be shorter than a distance threshold defined as a distance within which a field of view at the subject vehicle is obscured.

6. A vehicle light control system comprising:
    the vehicle light control apparatus of claim 1 mounted on the subject vehicle; and
    a plurality of vehicle light control apparatuses of claim 1 mounted on other vehicles, respectively,
    wherein mutual control of illumination modes is executed between the subject vehicle and the other vehicles based on signal transmission and signal reception of identification signals of the subject vehicle and the other vehicles.

7. The vehicle light control system according to claim 6, wherein the illumination adjustment requesting unit includes:
    an imaging device taking an image of other vehicles present near the subject vehicle; and
    an image processing unit for detecting brightness of the other vehicles and identifying the another vehicle in the other vehicles based on detected brightness exceeding a predetermined threshold.

8. The vehicle light control apparatus according to claim 7, wherein the illumination adjustment requesting unit further includes:
    a directional antenna;
    a direction detecting unit for detecting a direction of the another vehicle from the subject vehicle; and
    a communication unit for driving the directional antenna to point in a direction of the another vehicle to receive the another identification signal from the another unit and return the another identification signal to the another vehicle.

9. The vehicle light control apparatus according to claim 8, wherein the direction detecting unit calculates the direction of the another vehicle from the subject vehicle based on coordinates of a group of pixels having brightness exceeding the threshold among a group of pixels of an image taken by the imaging device a magnification of imaging performed by the imaging device.

10. The vehicle light control apparatus according to claim 9, wherein the illumination adjustment requesting unit includes:
   a distance detecting unit for detecting a distance of the another vehicle from the subject vehicle and returning the another identification signal when a detected distance decreases to be shorter than a distance threshold defined as a distance within which a field of view at the subject vehicle is obscured.

11. A vehicle light control method comprising:
taking an image of other vehicles around a subject vehicle;
receiving, from the other vehicles, identification signals unique to the other vehicles, respectively;
detecting, in the other vehicles, another vehicle that has brightness exceeding a predetermined threshold in the image;
transmitting, from the subject vehicle, a return signal identifying the another vehicle; and
reducing intensity of illumination of a headlight of the another vehicle in response to the return signal transmitted from the subject vehicle.

12. The vehicle light control method according to claim 11, further comprising:
   detecting a distance of the another vehicle from the subject vehicle,
   wherein the reducing reduces the intensity of illumination only when the distance becomes shorter than a threshold distance.

13. The vehicle light control method according to claim 11, wherein the taking takes the image existing forward of the subject vehicle.

14. The vehicle light control method according to claim 11, wherein the taking takes the image existing rearward of the subject vehicle.

15. The vehicle light control method according to claim 11, further comprising:
   driving a directional antenna of the subject vehicle in a direction toward the another vehicle when transmitting the return signal to the another vehicle.

* * * * *